(12) United States Patent
Littich et al.

(10) Patent No.: US 10,647,800 B2
(45) Date of Patent: May 12, 2020

(54) ALKOXYLATED UNSATURATED FATTY ACIDS AND USES THEREOF

(71) Applicant: Elevance Renewable Sciences, Inc., Woodridge, IL (US)

(72) Inventors: Ryan Littich, Powell, OH (US); Charles Coburn, Vernon Hills, IL (US); Paul A. Bertin, Western Springs, IL (US)

(73) Assignee: Elevance Renewable Sciences, Inc., Woodridge, IL (US)

( * ) Notice: Subject to any disclaimer, the term of this patent is extended or adjusted under 35 U.S.C. 154(b) by 0 days.

(21) Appl. No.: 16/126,035

(22) Filed: Sep. 10, 2018

(65) Prior Publication Data

US 2019/0144584 A1    May 16, 2019

Related U.S. Application Data

(63) Continuation of application No. 15/419,185, filed on Jan. 30, 2017, now Pat. No. 10,100,137.

(60) Provisional application No. 62/290,815, filed on Feb. 3, 2016, provisional application No. 62/305,563, filed on Mar. 9, 2016.

(51) Int. Cl.
| | |
|---|---|
| *C08F 218/08* | (2006.01) |
| *C08F 20/68* | (2006.01) |
| *C08F 120/68* | (2006.01) |
| *C08F 220/68* | (2006.01) |
| *C08F 2/30* | (2006.01) |

(52) U.S. Cl.
CPC ............ *C08F 218/08* (2013.01); *C08F 20/68* (2013.01); *C08F 120/68* (2013.01); *C08F 220/68* (2013.01); *C08F 2/30* (2013.01)

(58) Field of Classification Search
CPC ...... C08F 219/08; C08F 20/68; C08F 120/68; C08F 220/68
USPC .......................................................... 526/209
See application file for complete search history.

(56) References Cited

U.S. PATENT DOCUMENTS

| | | | |
|---|---|---|---|
| 10,100,137 B2 * | 10/2018 | Littich | ................. C08F 218/08 |
| 2011/0046269 A1 * | 2/2011 | Yuasa | ................. C04B 24/2647 |
| | | | 524/5 |

* cited by examiner

*Primary Examiner* — William K Cheung
(74) *Attorney, Agent, or Firm* — Kilpatrick Townsend & Stockton LLP

(57) ABSTRACT

Alkoxylated fatty acids are disclosed herein, as well as methods of making and using such compounds. In some embodiments, the alkoxylated fatty acids are formed from monomers derived from natural oils. In some embodiments, the alkoxylated fatty acids are used as surfactants for making synthetic latex by emulsion polymerization. In some other embodiments, the alkoxylated fatty acids are used as surfactants for making synthetic rubber, such as styrene-butadiene rubber. In some other embodiments, the alkoxylated fatty acids are used as surfactants in a composition for treatment of gas or oil wells, for cleaning applications, for use in various laundry-related applications, for use in personal care compositions, or for use as solvents for coating applications, such as reactive and non-reactive waterborne coating applications.

19 Claims, 1 Drawing Sheet

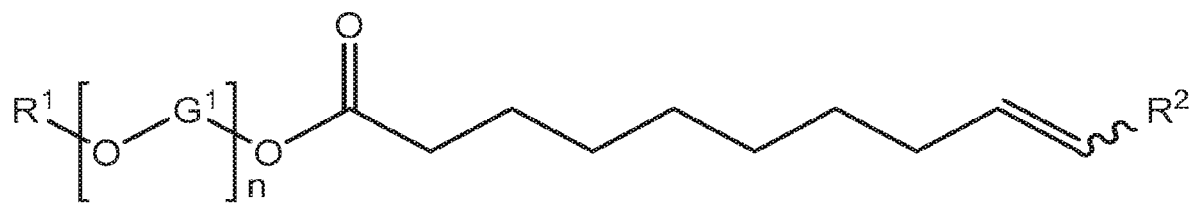

ALKOXYLATED UNSATURATED FATTY ACIDS AND USES THEREOF

CROSS-REFERENCE TO RELATED APPLICATIONS

This application is continued application of Ser. No. 15/419,185 filed Jan. 30, 2017, now U.S. Pat. No. 10,100137, which claims benefit of priority of United States Provisional Application Nos. 62/290,815, filed Feb. 3, 2016, and 62/305,563, filed Mar. 9, 2016, both of which are hereby incorporated by reference as though set forth herein in their entirety.

TECHNICAL FIELD

Alkoxylated fatty acids are disclosed herein, as well as methods of making and using such compounds. In some embodiments, the alkoxylated fatty acids are formed from monomers derived from natural oils. In some embodiments, the alkoxylated fatty acids are used as surfactants for making synthetic latex by emulsion polymerization. In some other embodiments, the alkoxylated fatty acids are used as surfactants for making synthetic rubber, such as styrene-butadiene rubber. In some other embodiments, the alkoxylated fatty acids are used as surfactants in a composition for treatment of gas or oil wells, for cleaning applications, for use in various laundry-related applications, for use in personal care compositions, or for use as solvents for coating applications, such as reactive and non-reactive waterborne coating applications.

BACKGROUND

Synthetic latexes are commonly made by emulsion polymerization. In certain emulsion polymerization processes, monomer compounds are suspended within an aqueous medium as part of micelles that are formed with the assistance of a surfactant. The polymerization reactions in such systems generally proceed by free radical polymerization. When the polymerization is complete, the resulting polymer can be removed from the aqueous medium. Or, in other instances, the resulting dispersion is the end product.

Emulsion polymerization presents a number of advantages as a method of making certain latexes by free radical polymerization. For example, the process allows for rapid polymerization in a temperature-controlled environment. Therefore, the properties of the resulting polymer do not change as the reaction proceeds and heat is generated. Further, emulsion polymerization permits the reaction medium to retain a near-constant viscosity, which also prevents the properties from changing as the reaction proceeds.

One drawback, however, is that the surfactants that enable the polymerization remain in the composition following the reaction. These surfactants can be difficult to remove from the polymer composition. Therefore, it may be desirable to discover surfactant compounds that have a sufficiently low critical micelle concentration and that do not require intensive removal efforts following polymerization.

Thus, there is a continuing need to discover novel surfactants that can serve such purposes and improve the properties of the polymers made by emulsion polymerization.

SUMMARY

In a first aspect, the disclosure provides compounds of formula (I):

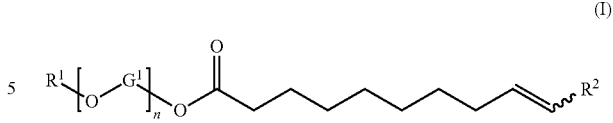

(I)

wherein: $R^1$ is a hydrogen atom or $C_{1-6}$ alkyl; $G^1$ is $C_{1-4}$ alkylene; $R^2$ is a hydrogen atom, $C_{1-5}$ alkyl, or $C_{2-5}$ alkenyl; and n is an integer from 1 to 50. In some embodiments, n is an integer from 6 to 50.

In a second aspect, the disclosure provides compositions comprising: water and one or more compounds of the first aspect. In some embodiments, the compositions further comprise one or more monomers, such as monomers suitable for forming synthetic latex materials using emulsion polymerization, or monomers suitable for forming a synthetic rubber, such as a styrene-butadiene rubber. In some embodiments, the one or monomers include vinyl compounds, acrylates, and various combinations thereof.

In a third aspect, the disclosure provides polymer compositions, which are formed from a reaction mixture, wherein the reaction mixture is a composition of any embodiments of the second aspect.

In a fourth aspect, the disclosure provides methods of forming a polymer composition, the methods comprising: providing a composition of any embodiments of the second aspect, such as those that include one or more monomers; and reacting the one or more monomers in the composition to form the polymer composition.

In a fifth aspect, the disclosure provides compositions comprising: water and one or more compounds of the first aspect, where the composition is suitable for use in treating an oil or gas well, for example, in combination with other materials, such as various terpenes (e.g., d-limonene) or saturated and/or unsaturated esters (e.g., methyl 9-decenoate, methyl 9-dodecenoate, and the like).

In a sixth aspect, the disclosure provides cleaning compositions comprising: water and one or more compounds of the first aspect, where the composition is suitable for use in various cleaning applications, such as hard-surface cleaning, and the like. In some such aspects, the disclosure provides methods of cleaning comprising: providing a composition comprising water and one or more compounds of the first aspect; and applying the composition to a surface to be cleaned. In some embodiments, the surface is a hard surface.

In a seventh aspect, the disclosure provides fabric care compositions comprising: water and one or more compounds of the first aspect, where the composition is suitable for use in various fabric-care applications, such as in laundry detergents, fabric softeners, and the like. In some such aspects, the disclosure provides methods for treating fabric, comprising: providing a composition comprising water and one or more compounds of the first aspect; and applying the composition to a fabric article.

In an eighth aspect, the disclosure provides personal care compositions comprising: water and one or more compounds of the first aspect, where the composition is suitable for use in various personal care applications. In some embodiments, the compositions are in the form of an emulsion, such as an oil-in-water or a water-in-oil emulsion. In some such aspects, the disclosure provides methods for treating mammalian skin or hair, comprising: providing a composition comprising water and one or more compounds of the first aspect; and applying the composition to mammalian skin or hair. In some embodiments, the mammalian skin or hair is human skin or hair.

In a ninth aspect, the disclosure provides coating compositions comprising: water, a resin, and one or more compounds of the first aspect. In some embodiments, the resin is a film-forming polymer. In some such embodiments, the film-forming polymer is a natural or synthetic latex. In some other embodiments, the resin is an alkyd resin. In some such aspects, the disclosure provides methods for coating a surface, comprising: providing a composition comprising water, a resin, and one or more compounds of the first aspect; and applying the composition to a surface to be coated. In some embodiments, the resin is a film-forming polymer. In some other embodiments, the resin is an alkyd resin.

In certain other aspects, the disclosure provides various compositions and methods that employ compounds of the first aspect. These and other aspects and embodiments are set forth in the foregoing drawings, detailed description, and claims.

BRIEF DESCRIPTION OF THE DRAWINGS

The following drawings are provided for purposes of illustrating various embodiments of the compositions and methods disclosed herein. The drawings are provided for illustrative purposes only, and are not intended to describe any preferred compositions or preferred methods, or to serve as a source of any limitations on the scope of the claimed inventions.

The FIGURE shows a compound of certain aspects and embodiments disclosed herein, wherein $R^1$ is a hydrogen atom or an alkyl group; $G^1$ is an alkylene group; $R^2$ is a hydrogen atom, an alkyl group, or an alkenyl group; and n is an integer from 1 to 50.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, "polymer" refers to a substance having a chemical structure that includes the multiple repetition of constitutional units formed from substances of comparatively low relative molecular mass relative to the molecular mass of the polymer. The term "polymer" includes soluble and/or fusible molecules having chains of repeat units, and also includes insoluble and infusible networks. As used herein, the term "polymer" can include oligomeric materials, which have only a few (e.g., 5-100) constitutional units As used herein, "monomer" refers to a substance that can undergo a polymerization reaction to contribute constitutional units to the chemical structure of a polymer.

As used herein, "copolymer" refers to a polymer having constitutional units formed from more than one species of monomer.

As used herein, "natural oil," "natural feedstock," or "natural oil feedstock" refer to oils derived from plants or animal sources. These terms include natural oil derivatives, unless otherwise indicated. The terms also include modified plant or animal sources (e.g., genetically modified plant or animal sources), unless indicated otherwise. Examples of natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

As used herein, "natural oil derivatives" refers to the compounds or mixtures of compounds derived from a natural oil using any one or combination of methods known in the art. Such methods include but are not limited to saponification, fat splitting, transesterification, esterification, hydrogenation (partial, selective, or full), isomerization, oxidation, and reduction. Representative non-limiting examples of natural oil derivatives include gums, phospholipids, soapstock, acidulated soapstock, distillate or distillate sludge, fatty acids and fatty acid alkyl ester (e.g. non-limiting examples such as 2-ethylhexyl ester), hydroxy substituted variations thereof of the natural oil. For example, the natural oil derivative may be a fatty acid methyl ester ("FAME") derived from the glyceride of the natural oil. In some embodiments, a feedstock includes canola or soybean oil, as a non-limiting example, refined, bleached, and deodorized soybean oil (i.e., RBD soybean oil). Soybean oil typically comprises about 95% weight or greater (e.g., 99% weight or greater) triglycerides of fatty acids. Major fatty acids in the polyol esters of soybean oil include saturated fatty acids, as a non-limiting example, palmitic acid (hexadecanoic acid) and stearic acid (octadecanoic acid), and unsaturated fatty acids, as a non-limiting example, oleic acid (9-octadecenoic acid), linoleic acid (9,12-octadecadienoic acid), and linolenic acid (9,12,15-octadecatrienoic acid).

As used herein, "metathesis catalyst" includes any catalyst or catalyst system that catalyzes an olefin metathesis reaction.

As used herein, "metathesize" or "metathesizing" refer to the reacting of a feedstock in the presence of a metathesis catalyst to form a "metathesized product" comprising new olefinic compounds, i.e., "metathesized" compounds. Metathesizing is not limited to any particular type of olefin metathesis, and may refer to cross-metathesis (i.e., co-metathesis), self-metathesis, ring-opening metathesis, ring-opening metathesis polymerizations ("ROMP"), ring-closing metathesis ("RCM"), and acyclic diene metathesis ("ADMET"). In some embodiments, metathesizing refers to reacting two triglycerides present in a natural feedstock (self-metathesis) in the presence of a metathesis catalyst, wherein each triglyceride has an unsaturated carbon-carbon double bond, thereby forming a new mixture of olefins and esters which may include a triglyceride dimer. Such triglyceride dimers may have more than one olefinic bond, thus higher oligomers also may form. Additionally, in some other embodiments, metathesizing may refer to reacting an olefin, such as ethylene, and a triglyceride in a natural feedstock having at least one unsaturated carbon-carbon double bond, thereby forming new olefinic molecules as well as new ester molecules (cross-metathesis).

As used herein, "olefin" or "olefins" refer to compounds having at least one unsaturated carbon-carbon double bond. In certain embodiments, the term "olefins" refers to a group of unsaturated carbon-carbon double bond compounds with different carbon lengths. Unless noted otherwise, the terms "olefin" or "olefins" encompasses "polyunsaturated olefins" or "poly-olefins," which have more than one carbon-carbon double bond. As used herein, the term "monounsaturated olefins" or "mono-olefins" refers to compounds having only one carbon-carbon double bond. A compound having a terminal carbon-carbon double bond can be referred to as a "terminal olefin" or an "alpha-olefin," while an olefin having a non-terminal carbon-carbon double bond can be referred to as an "internal olefin." In some embodiments, the alpha-olefin is a terminal alkene, which is an alkene (as defined below) having a terminal carbon-carbon double bond. Additional carbon-carbon double bonds can be present.

As used herein, the term "low-molecular-weight olefin" may refer to any one or combination of unsaturated straight, branched, or cyclic hydrocarbons in the $C_{2-14}$ range. Low-molecular-weight olefins include alpha-olefins, wherein the unsaturated carbon-carbon bond is present at one end of the compound. Low-molecular-weight olefins may also include dienes or trienes. Low-molecular-weight olefins may also include internal olefins or "low-molecular-weight internal olefins." In certain embodiments, the low-molecular-weight internal olefin is in the $C_{4-14}$ range. Examples of low-molecular-weight olefins in the $C_{2-6}$ range include, but are not limited to: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. Non-limiting examples of low-molecular-weight olefins in the $C_{7-9}$ range include 1,4-heptadiene, 1-heptene, 3,6-nonadiene, 3-nonene, 1,4,7-octatriene. Other possible low-molecular-weight olefins include styrene and vinyl cyclohexane. In certain embodiments, it is preferable to use a mixture of olefins, the mixture comprising linear and branched low-molecular-weight olefins in the $C_{4-10}$ range. Olefins in the $C_{4-10}$ range can also be referred to as "short-chain olefins," which can be either branched or unbranched. In one embodiments, it may be preferable to use a mixture of linear and branched $C_4$ olefins (i.e., combinations of: 1-butene, 2-butene, and/or isobutene). In other embodiments, a higher range of $C_{11-14}$ may be used.

The number of carbon atoms in any group or compound can be represented by the terms: "$C_z$", which refers to a group of compound having z carbon atoms; and "$C_{x-y}$", which refers to a group or compound containing from x to y, inclusive, carbon atoms. For example, "$C_{1-6}$ alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. As a further example, a "$C_{4-10}$ alkene" refers to an alkene molecule having from 4 to 10 carbon atoms, and, for example, includes, but is not limited to, 1-butene, 2-butene, isobutene, 1-pentene, 1-hexene, 3-hexene, 1-heptene, 3-heptene, 1-octene, 4-octene, 1-nonene, 4-nonene, and 1-decene.

In some instances, the olefin can be an "alkene," which refers to a straight- or branched-chain non-aromatic hydrocarbon having 2 to 30 carbon atoms and one or more carbon-carbon double bonds, which may be optionally substituted, as herein further described, with multiple degrees of substitution being allowed. A "monounsaturated alkene" refers to an alkene having one carbon-carbon double bond, while a "polyunsaturated alkene" refers to an alkene having two or more carbon-carbon double bonds. A "lower alkene," as used herein, refers to an alkene having from 2 to 10 carbon atoms.

As used herein, "ester" or "esters" refer to compounds having the general formula: R—COO—R', wherein R and R' denote any organic group (such as alkyl, aryl, or silyl groups) including those bearing heteroatom-containing substituent groups. In certain embodiments, R and R' denote alkyl, alkenyl, aryl, or alcohol groups. In certain embodiments, the term "esters" may refer to a group of compounds with the general formula described above, wherein the compounds have different carbon lengths. In certain embodiments, the esters may be esters of glycerol, which is a trihydric alcohol. The term "glyceride" can refer to esters where one, two, or three of the —OH groups of the glycerol have been esterified.

It is noted that an olefin may also comprise an ester, and an ester may also comprise an olefin, if the R or R' group in the general formula R—COO—R' contains an unsaturated carbon-carbon double bond. Such compounds can be referred to as "unsaturated esters" or "olefin ester" or "olefinic ester compounds." Further, a "terminal olefinic ester compound" may refer to an ester compound where R has an olefin positioned at the end of the chain. An "internal olefin ester" may refer to an ester compound where R has an olefin positioned at an internal location on the chain. Additionally, the term "terminal olefin" may refer to an ester or an acid thereof where R' denotes hydrogen or any organic compound (such as an alkyl, aryl, or silyl group) and R has an olefin positioned at the end of the chain, and the term "internal olefin" may refer to an ester or an acid thereof where R' denotes hydrogen or any organic compound (such as an alkyl, aryl, or silyl group) and R has an olefin positioned at an internal location on the chain.

As used herein, "alkyl" refers to a straight or branched chain saturated hydrocarbon having 1 to 30 carbon atoms, which may be optionally substituted, as herein further described, with multiple degrees of substitution being allowed. Examples of "alkyl," as used herein, include, but are not limited to, methyl, ethyl, n-propyl, isopropyl, isobutyl, n-butyl, sec-butyl, tert-butyl, isopentyl, n-pentyl, neopentyl, n-hexyl, and 2-ethylhexyl. The number of carbon atoms in an alkyl group is represented by the phrase "$C_{x-y}$ alkyl," which refers to an alkyl group, as herein defined, containing from x to y, inclusive, carbon atoms. Thus, "$C_{1-6}$ alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. In some instances, the "alkyl" group can be divalent, in which case the group can alternatively be referred to as an "alkylene" group.

As used herein, "alkenyl" refers to a straight or branched chain unsaturated hydrocarbon having 2 to 30 carbon atoms and one or more carbon-carbon double bonds, which may be optionally substituted, as herein further described, with multiple degrees of substitution being allowed. Examples of "alkenyl," as used herein, include, but are not limited to, vinyl, allyl, 2-butenyl, 3-butenyl, 1-butenyl, 2-pentenyl, 3-hexenyl, and the like. The number of carbon atoms in an alkenyl group is represented by the phrase "$C_{x-y}$ alkenyl," which refers to an alkenyl group, as herein defined, containing from x to y, inclusive, carbon atoms. Thus, "$C_{2-6}$ alkenyl" represents an alkyl chain having from 2 to 6 carbon atoms and, for example, includes, but is not limited to, vinyl, allyl, 2-butenyl, 3-butenyl, 1-butenyl, 2-pentenyl, 3-hexenyl, and the like. In some instances, the "alkenyl" group can be divalent, in which case the group can alternatively be referred to as an "alkenylene" group.

As used herein, "substituted" refers to substitution of one or more hydrogen atoms of the designated moiety with the named substituent or substituents, multiple degrees of substitution being allowed unless otherwise stated, provided that the substitution results in a stable or chemically feasible compound. A stable compound or chemically feasible compound is one in which the chemical structure is not substantially altered when kept at a temperature from about −80° C. to about +40° C., in the absence of moisture or other chemically reactive conditions, for at least a week, or a compound which maintains its integrity long enough to be useful for therapeutic or prophylactic administration to a patient. As used herein, the phrases "substituted with one or more . . . " or "substituted one or more times . . . " refer to a number of substituents that equals from one to the maximum number of substituents possible based on the number of available bonding sites, provided that the above conditions of stability and chemical feasibility are met.

As used herein, "mix" or "mixed" or "mixture" refers broadly to any combining of two or more compositions. The two or more compositions need not have the same physical state; thus, solids can be "mixed" with liquids, e.g., to form a slurry, suspension, or solution. Further, these terms do not require any degree of homogeneity or uniformity of composition. This, such "mixtures" can be homogeneous or heterogeneous, or can be uniform or non-uniform. Further, the terms do not require the use of any particular equipment to carry out the mixing, such as an industrial mixer.

As used herein, "optionally" means that the subsequently described event(s) may or may not occur. In some embodiments, the optional event does not occur. In some other embodiments, the optional event does occur one or more times.

As used herein, "comprise" or "comprises" or "comprising" or "comprised of" refer to groups that are open, meaning that the group can include additional members in addition to those expressly recited. For example, the phrase, "comprises A" means that A must be present, but that other members can be present too. The terms "include," "have," and "composed of" and their grammatical variants have the same meaning. In contrast, "consist of" or "consists of" or "consisting of" refer to groups that are closed. For example, the phrase "consists of A" means that A and only A is present.

As used herein, "or" is to be given its broadest reasonable interpretation, and is not to be limited to an either/or construction. Thus, the phrase "comprising A or B" means that A can be present and not B, or that B is present and not A, or that A and B are both present. Further, if A, for example, defines a class that can have multiple members, e.g., $A_1$ and $A_2$, then one or more members of the class can be present concurrently.

As used herein, the various functional groups represented will be understood to have a point of attachment at the functional group having the hyphen or dash (-) or an asterisk (*). In other words, in the case of —$CH_2CH_2CH_3$, it will be understood that the point of attachment is the $CH_2$ group at the far left. If a group is recited without an asterisk or a dash, then the attachment point is indicated by the plain and ordinary meaning of the recited group.

As used herein, multi-atom bivalent species are to be read from left to right. For example, if the specification or claims recite A-D-E and D is defined as —OC(O)—, the resulting group with D replaced is: A-OC(O)-E and not A-C(O)O-E.

In some instances herein, organic compounds are described using the "line structure" methodology, where chemical bonds are indicated by a line, where the carbon atoms are not expressly labeled, and where the hydrogen atoms covalently bound to carbon (or the C—H bonds) are not shown at all. For example, by that convention, the formula

represents n-propane. In some instances herein, a squiggly bond is used to show the compound can have any one of two or more isomers. For example, the structure

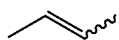

can refer to (E)-2-butene, (Z)-2-butene, or mixtures thereof. In some embodiments, the compounds disclosed herein are generated via olefin metathesis from natural oils, which can result in scrambling of the stereochemistry around the carbon-carbon double bond, creating a mixture of E and Z compounds (where $R^2$ is not a hydrogen atom). In some embodiments herein, which contain compounds of formula (I) and where $R^2$ is not a hydrogen atom, the composition comprises at least 1% by weight, or at least 2% by weight, or at least 5% by weight, or at least 10% by weight, or at least 20% by weight, or at least 35% by weight, or at least 50% by weight, or at least 65% by weight, or at least 75% by weight, of compounds of formula (I) where the substituents on the carbon-carbon double bond are in the E (trans) configuration, based on the total weight of compounds of formula (I) in the composition.

Other terms are defined in other portions of this description, even though not included in this subsection.

Alkoxylated Unsaturated Fatty Acid Compounds

In a first aspect, the disclosure provides compounds of formula (I):

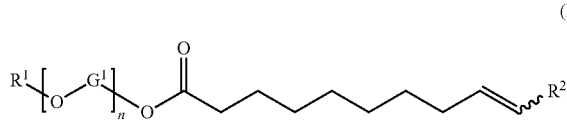

wherein: $R^1$ is a hydrogen atom or $C_{1-6}$ alkyl; $G^1$ is $C_{1-4}$ alkylene; $R^2$ is a hydrogen atom, $C_{1-5}$ alkyl, or $C_{2-5}$ alkenyl; and n is an integer from 1 to 50.

In some embodiments, $R^1$ is a hydrogen atom. In some other embodiments of any of the aforementioned embodiments, $R^1$ is $C_{1-6}$ alkyl. In some such embodiments, $R^1$ is methyl or ethyl. In some such embodiments, $R^1$ is methyl. In some other such embodiments, $R^1$ is ethyl.

In some embodiments of any of the aforementioned embodiments, $G^1$ is, independently at each occurrence, —$CH_2$—$CH_2$—, —$CH_2$—$CH_2$—$CH_2$—, —$CH(CH_3)$—$CH_2$—, —$CH_2$—$CH(CH_3)$—, or —$CH_2$—$CH_2$—$CH_2$—$CH_2$—. In some such embodiments, $G^1$ is —$CH_2$—$CH_2$—.

In some embodiments of any of the aforementioned embodiments, $R^2$ is a hydrogen atom. In some other embodiments of any of the aforementioned embodiments, $R^2$ is $C_{1-5}$ alkyl. In some such embodiments, $R^2$ is methyl or ethyl. In some further such embodiments, $R^2$ is methyl. In some further such embodiments, $R^2$ is ethyl. In some other embodiments of any of the aforementioned embodiments, $R^2$ is $C_{2-5}$ alkenyl. In some such embodiments, $R^2$ is —$CH_2$—$CH$=$CH_2$ or —$CH_2$—$CH$=$CH$—$CH_2$—$CH_3$.

In some embodiments of any of the aforementioned embodiments, $R^2$ is not a hydrogen atom. In some such embodiments, a composition (according to any of the aspects or embodiments set forth below) comprising compounds of formula (I) contains compounds of formula (I) having an E configuration around the carbon-carbon double bond to which $R^2$ is attached, and compounds of formula (I) having an Z configuration around the carbon-carbon double bond to which $R^2$ is attached, wherein the compounds of formula (I) having a Z configuration around the carbon-carbon double bond to which $R^2$ is attached make up at least 1% by weight, or at least 2% by weight, or at least 5% by weight, or at least 10% by weight, or at least 20% by weight, or at least 35% by weight, or at least 50% by weight, or at least 65% by weight, or at least 75% by weight, of compounds of formula (I) in the composition, based on the total weight of compounds of formula (I) in the composition.

In some embodiments of any of the aforementioned embodiments, n is an integer from 6 to 50, or n is an integer from 6 to 30, or n is an integer from 6 to 24, or n is an integer from 6 to 18, or n is an integer from 8 to 16, or n is an integer from 9 to 15, or n is an integer from 1 to 5, or n is an integer from 1 to 4, or n is an integer from 1 to 3, or n is an integer from 1 to 2.

Compositions Including Alkoxylated Unsaturated Fatty Acids

In some other aspects and embodiments, the disclosure provides compositions comprising: water and one or more compounds of the aforementioned aspects and embodiments.

In some such embodiments, the compositions further comprise one or more monomers, such as monomers for forming synthetic latex materials, e.g., using emulsion polymerization. In some embodiments, the one or more monomers comprise free-radical-polymerizable monomers. For example, in some embodiments, the one or more monomers comprise monomers selected from the group consisting of vinyl compounds (e.g., vinyl alcohol, vinyl acetate, vinyl chloride, vinyl fluoride, and the like), acrylic acid, acrylates (e.g., alkyl acrylates, such as methyl acrylate, ethyl acrylate, propyl acrylate, butyl acrylate, etc., and alkyl various methacrylates, such as methyl methacrylate, and the like), alkenes (e.g., ethylene, propylene, butadiene, and the like), halo-substituted alkenes (e.g., vinyl chloride, vinyl fluoride, tetrafluoroethene, and the like), nitrile-substituted alkenes (e.g., acrylonitrile, and the like), styrene, and mixtures thereof.

In some embodiments, the composition is an emulsion having a dispersed phase and a continuous phase. In some embodiments, the continuous phase comprises water. In some other embodiments, the dispersed phase comprises at least a portion of the one or more monomers.

In some embodiments, the compositions include certain other materials. For example, in some embodiments, the composition further comprises a free radical initiator, e.g., which can initiate polymerization of the one or more monomers, and, in some embodiments, incorporation of the compounds of formula (I) into the resulting polymer.

Other materials may also be included in the composition. For example, in some embodiments, the composition includes one or more additional comonomers. In some embodiments, the composition includes one or more surfactants (in addition to the compounds of formula (I)). In some such embodiments, the one or more surfactants are selected from the group consisting of anionic surfactants, ionic surfactants, nonionic surfactants, and mixtures thereof. In some embodiments, the composition comprises one or more non-surfactant stabilizers. In some embodiments, the composition comprises one or more additives, such as chain transfer agents, buffering agents, and salts.

Uses as Surfactants for Emulsion Polymerization

In other aspects and embodiments, the disclosure provides polymer compositions, which are formed from a reaction mixture, wherein the reaction mixture is a composition of any embodiments of the foregoing aspects and embodiments. In some embodiments, the polymer composition is a synthetic latex, e.g., which is formed by emulsion polymerization. In some embodiments, the polymer composition is a synthetic rubber, e.g., a styrene-butadiene rubber.

In some other aspects and embodiments, the disclosure provides methods of forming a polymer composition, the methods comprising: providing a composition of the foregoing aspects and embodiments, such as those that include one or more monomers; and reacting the one or more monomers in the composition to form the polymer composition. In some embodiments, the polymer composition is a synthetic latex, e.g., which is formed by emulsion polymerization.

Other Uses

In other aspects and embodiments, the compounds of formula (I) can be put to a number of other uses and applications. These include, but are not limited to, paint compositions, adhesive compositions, paper coatings, textile sizing, non-woven textiles, glass fibers sizing compositions, binder compositions, floor polishes, inks, carpet backing materials, household cleaners, and laundry-related compositions.

In some aspects and embodiments, the disclosure provides compositions (e.g., aqueous compositions) for use in treating an oil or a gas well that include one or more compounds of formula (I). In some such embodiments, the compositions also include other treatment compounds, such as terpenes (e.g., d-limonene) and/or unsaturated esters (e.g., methyl 9-decenoate and/or methyl 9-dodecenoate).

In some aspects and embodiments, the disclosure provides cleaning compositions comprising: water and one or more compounds of formula (I), where the composition is suitable for use in various cleaning applications, such as hard-surface cleaning, and the like. In some such aspects, the disclosure provides methods of cleaning comprising: providing a composition comprising water and one or more compounds of formula (I); and applying the composition to a surface to be cleaned. In some embodiments, the surface is a hard surface.

In some aspects and embodiments, the disclosure provides fabric care compositions comprising: water and one or more compounds of formula (I), where the composition is suitable for use in various fabric-care applications, such as in laundry detergents, fabric softeners, and the like. In some such aspects, the disclosure provides methods for treating fabric, comprising: providing a composition comprising water and one or more compounds of formula (I); and applying the composition to a fabric article.

In some aspects and embodiments, the disclosure provides personal care compositions comprising: water and one or more compounds of formula (I), where the composition is suitable for use in various personal care applications. In some embodiments, the compositions are in the form of an emulsion, such as an oil-in-water or a water-in-oil emulsion. In some such aspects, the disclosure provides methods for treating mammalian skin or hair, comprising: providing a composition comprising water and one or more compounds of formula (I); and applying the composition to mammalian skin or hair. In some embodiments, the mammalian skin or hair is human skin or hair.

In some aspects and embodiments, the disclosure provides coating compositions comprising: water, a resin, and one or more compounds of formula (I). In some embodiments, the resin is a film-forming polymer. In some such embodiments, the film-forming polymer is a natural or synthetic latex. In some other embodiments, the resin is an alkyd resin. In some such aspects, the disclosure provides methods for coating a surface, comprising: providing a composition comprising water, a resin, and one or more compounds of formula (I); and applying the composition to a surface to be coated. In some embodiments, the resin is a film-forming polymer. In some other embodiments, the resin is an alkyd resin.

Derivation from Renewable Sources

The compounds employed in any of the aspects or embodiments disclosed herein can, in certain embodiments, be derived from renewable sources, such as from various natural oils or their derivatives. Any suitable methods can be used to make these compounds from such renewable sources. Suitable methods include, but are not limited to, fermentation, conversion by bioorganisms, and conversion by metathesis.

Olefin metathesis provides one possible means to convert certain natural oil feedstocks into olefins and esters that can be used in a variety of applications, or that can be further modified chemically and used in a variety of applications. In some embodiments, a composition (or components of a composition) may be formed from a renewable feedstock, such as a renewable feedstock formed through metathesis reactions of natural oils and/or their fatty acid or fatty ester derivatives. When compounds containing a carbon-carbon double bond undergo metathesis reactions in the presence of a metathesis catalyst, some or all of the original carbon-carbon double bonds are broken, and new carbon-carbon double bonds are formed. The products of such metathesis reactions include carbon-carbon double bonds in different locations, which can provide unsaturated organic compounds having useful chemical properties.

A wide range of natural oils, or derivatives thereof, can be used in such metathesis reactions. Examples of suitable natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

The natural oil may include canola or soybean oil, such as refined, bleached and deodorized soybean oil (i.e., RBD soybean oil). Soybean oil typically includes about 95 percent by weight (wt %) or greater (e.g., 99 wt % or greater) triglycerides of fatty acids. Major fatty acids in the polyol esters of soybean oil include but are not limited to saturated fatty acids such as palmitic acid (hexadecanoic acid) and stearic acid (octadecanoic acid), and unsaturated fatty acids such as oleic acid (9-octadecenoic acid), linoleic acid (9,12-octadecadienoic acid), and linolenic acid (9,12,15-octadecatrienoic acid).

Metathesized natural oils can also be used. Examples of metathesized natural oils include but are not limited to a metathesized vegetable oil, a metathesized algal oil, a metathesized animal fat, a metathesized tall oil, a metathesized derivatives of these oils, or mixtures thereof. For example, a metathesized vegetable oil may include metathesized canola oil, metathesized rapeseed oil, metathesized coconut oil, metathesized corn oil, metathesized cottonseed oil, metathesized olive oil, metathesized palm oil, metathesized peanut oil, metathesized safflower oil, metathesized sesame oil, metathesized soybean oil, metathesized sunflower oil, metathesized linseed oil, metathesized palm kernel oil, metathesized tung oil, metathesized jatropha oil, metathesized mustard oil, metathesized camelina oil, metathesized pennycress oil, metathesized castor oil, metathesized derivatives of these oils, or mixtures thereof. In another example, the metathesized natural oil may include a metathesized animal fat, such as metathesized lard, metathesized tallow, metathesized poultry fat, metathesized fish oil, metathesized derivatives of these oils, or mixtures thereof.

Such natural oils, or derivatives thereof, can contain esters, such as triglycerides, of various unsaturated fatty acids. The identity and concentration of such fatty acids varies depending on the oil source, and, in some cases, on the variety. In some embodiments, the natural oil comprises one or more esters of oleic acid, linoleic acid, linolenic acid, or any combination thereof. When such fatty acid esters are metathesized, new compounds are formed. For example, in embodiments where the metathesis uses certain short-chain olefins, e.g., ethylene, propylene, or 1-butene, and where the natural oil includes esters of oleic acid, an amount of 1-decene and 1-decenoid acid (or an ester thereof), among other products, are formed. Following transesterification, for example, with an alkyl alcohol, an amount of 9-denenoic acid alkyl ester is formed. In some such embodiments, a separation step may occur between the metathesis and the transesterification, where the alkenes are separated from the esters. In some other embodiments, transesterification can occur before metathesis, and the metathesis is performed on the transesterified product.

In some embodiments, the natural oil can be subjected to various pre-treatment processes, which can facilitate their utility for use in certain metathesis reactions. Useful pre-treatment methods are described in United States Patent Application Publication Nos. 2011/0113679, 2014/0275595, and 2014/0275681, all three of which are hereby incorporated by reference as though fully set forth herein.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linoleic acid, or combinations thereof. In some other embodiments, the unsaturated glyceride is the product of the partial hydrogenation and/or the metathesis of another unsaturated glyceride (as described above).

The conditions for such metathesis reactions, and the reactor design, and suitable catalysts are as described below with reference to the metathesis of the olefin esters. That discussion is incorporated by reference as though fully set forth herein.

Olefin Metathesis

In some embodiments, one or more of the unsaturated monomers can be made by metathesizing a natural oil or natural oil derivative. The terms "metathesis" or "metathesizing" can refer to a variety of different reactions, including, but not limited to, cross-metathesis, self-metathesis, ring-opening metathesis, ring-opening metathesis polymerizations ("ROMP"), ring-closing metathesis ("RCM"), and acyclic diene metathesis ("ADMET"). Any suitable metathesis reaction can be used, depending on the desired product or product mixture.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linoleic acid, or combinations thereof. In some other embodiments, the unsaturated glyceride is the product of the partial hydrogenation and/or the metathesis of another unsaturated glyceride (as described above).

The metathesis process can be conducted under any conditions adequate to produce the desired metathesis products. For example, stoichiometry, atmosphere, solvent, temperature, and pressure can be selected by one skilled in the art to produce a desired product and to minimize undesirable byproducts. In some embodiments, the metathesis process may be conducted under an inert atmosphere. Similarly, in embodiments where a reagent is supplied as a gas, an inert gaseous diluent can be used in the gas stream. In such embodiments, the inert atmosphere or inert gaseous diluent typically is an inert gas, meaning that the gas does not interact with the metathesis catalyst to impede catalysis to a substantial degree. For example, non-limiting examples of inert gases include helium, neon, argon, and nitrogen, used individually or in with each other and other inert gases.

The reactor design for the metathesis reaction can vary depending on a variety of factors, including, but not limited to, the scale of the reaction, the reaction conditions (heat, pressure, etc.), the identity of the catalyst, the identity of the materials being reacted in the reactor, and the nature of the feedstock being employed. Suitable reactors can be designed by those of skill in the art, depending on the relevant factors, and incorporated into a refining process such, such as those disclosed herein.

The metathesis reactions disclosed herein generally occur in the presence of one or more metathesis catalysts. Such methods can employ any suitable metathesis catalyst. The metathesis catalyst in this reaction may include any catalyst or catalyst system that catalyzes a metathesis reaction. Any known metathesis catalyst may be used, alone or in combination with one or more additional catalysts. Examples of metathesis catalysts and process conditions are described in US 2011/0160472, incorporated by reference herein in its entirety, except that in the event of any inconsistent disclosure or definition from the present specification, the disclosure or definition herein shall be deemed to prevail. A number of the metathesis catalysts described in US 2011/0160472 are presently available from Materia, Inc. (Pasadena, Calif.).

In some embodiments, the metathesis catalyst includes a Grubbs-type olefin metathesis catalyst and/or an entity derived therefrom. In some embodiments, the metathesis catalyst includes a first-generation Grubbs-type olefin metathesis catalyst and/or an entity derived therefrom. In some embodiments, the metathesis catalyst includes a second-generation Grubbs-type olefin metathesis catalyst and/or an entity derived therefrom. In some embodiments, the metathesis catalyst includes a first-generation Hoveyda-Grubbs-type olefin metathesis catalyst and/or an entity derived therefrom. In some embodiments, the metathesis catalyst includes a second-generation Hoveyda-Grubbs-type olefin metathesis catalyst and/or an entity derived therefrom. In some embodiments, the metathesis catalyst includes one or a plurality of the ruthenium carbene metathesis catalysts sold by Materia, Inc. of Pasadena, Calif. and/or one or more entities derived from such catalysts. Representative metathesis catalysts from Materia, Inc. for use in accordance with the present teachings include but are not limited to those sold under the following product numbers as well as combinations thereof: product no. C823 (CAS no. 172222-30-9), product no. C848 (CAS no. 246047-72-3), product no. C601 (CAS no. 203714-71-0), product no. C627 (CAS no. 301224-40-8), product no. C571 (CAS no. 927429-61-6), product no. C598 (CAS no. 802912-44-3), product no. C793 (CAS no. 927429-60-5), product no. C801 (CAS no. 194659-03-9), product no. C827 (CAS no. 253688-91-4), product no. C884 (CAS no. 900169-53-1), product no. C833 (CAS no. 1020085-61-3), product no. C859 (CAS no. 832146-68-6), product no. C711 (CAS no. 635679-24-2), product no. C933 (CAS no. 373640-75-6).

In some embodiments, the metathesis catalyst includes a molybdenum and/or tungsten carbene complex and/or an entity derived from such a complex. In some embodiments, the metathesis catalyst includes a Schrock-type olefin metathesis catalyst and/or an entity derived therefrom. In some embodiments, the metathesis catalyst includes a high-oxidation-state alkylidene complex of molybdenum and/or an entity derived therefrom. In some embodiments, the metathesis catalyst includes a high-oxidation-state alkylidene complex of tungsten and/or an entity derived therefrom. In some embodiments, the metathesis catalyst includes molybdenum (VI). In some embodiments, the metathesis catalyst includes tungsten (VI). In some embodiments, the metathesis catalyst includes a molybdenum- and/or a tungsten-containing alkylidene complex of a type described in one or more of (a) Angew. Chem. Int. Ed. Engl., 2003, 42, 4592-4633; (b) Chem. Rev., 2002, 102, 145-179; and/or (c) Chem. Rev., 2009, 109, 3211-3226, each of which is incorporated by reference herein in its entirety, except that in the event of any inconsistent disclosure or definition from the present specification, the disclosure or definition herein shall be deemed to prevail.

In certain embodiments, the metathesis catalyst is dissolved in a solvent prior to conducting the metathesis reaction. In certain such embodiments, the solvent chosen may be selected to be substantially inert with respect to the metathesis catalyst. For example, substantially inert solvents include, without limitation: aromatic hydrocarbons, such as benzene, toluene, xylenes, etc.; halogenated aromatic hydrocarbons, such as chlorobenzene and dichlorobenzene; aliphatic solvents, including pentane, hexane, heptane, cyclohexane, etc.; and chlorinated alkanes, such as dichloromethane, chloroform, dichloroethane, etc. In some embodiments, the solvent comprises toluene.

In other embodiments, the metathesis catalyst is not dissolved in a solvent prior to conducting the metathesis reaction. The catalyst, instead, for example, can be slurried with the natural oil or unsaturated ester, where the natural oil or unsaturated ester is in a liquid state. Under these conditions, it is possible to eliminate the solvent (e.g., toluene) from the process and eliminate downstream olefin losses when separating the solvent. In other embodiments, the metathesis catalyst may be added in solid state form (and not slurried) to the natural oil or unsaturated ester (e.g., as an auger feed).

The metathesis reaction temperature may, in some instances, be a rate-controlling variable where the temperature is selected to provide a desired product at an acceptable rate. In certain embodiments, the metathesis reaction temperature is greater than −40° C., or greater than −20° C., or greater than 0° C., or greater than 10° C. In certain embodiments, the metathesis reaction temperature is less than 200° C., or less than 150° C., or less than 120° C. In some embodiments, the metathesis reaction temperature is between 0° C. and 150° C., or is between 10° C. and 120° C.

EXAMPLES

Example 1

Synthetic Procedure

Into a 1 liter 3-necked round-bottomed flask equipped with a stir bar, thermocouple, Dean-Stark trap, condenser, glass stopper, heating mantle, and nitrogen inlet was added the fatty acid (9-decenoic acid, 9-DA, 75.0 g, 0.440 mol). To this was added an equal molar amount of the methoxy polyethylene glycol (Carbowax™ 550, 252 g, 0.440 mol), toluene (325 g), and p-toluene sulfonic acid (pTsOH, 1.0 g). This was stirred (500 RPM) and heated to reflux (118 to 124° C.). Heating was continued until the theoretical amount of water was collected in the Dean-Stark trap (7.9 ml), usually after 8 hours. The water was drained from the Dean-Stark trap and the reaction continued (8 h) until no more water accumulated (<1.0 ml). During this time the reaction darkened to a yellow-orange color. Heating was discontinued and the cooled (60° C.) solution was transferred into a 2 liter pear-shaped flask and concentrated in vacuo (95° C./full vacuum). The hot product (uC10MEE-12EO) was neutralized, transferred into a tared eight ounce clear bottle, and weighted (quantitative yield). Using a similar procedure, 7EO and 16EO variants of the same ester were made.

Example 2

Foam Height

The 9-decenoic acid methyl ester ethoxylates (uC10MEE-XXEO) demonstrate significantly lower foam generation than their saturated counterparts (C10MEE-XXEO), and lower foaming relative to commercial alkylphenol ethoxylates (Table 1). Mitigation of surfactant-driven foaming is an important trait that can impact the quality of finished coatings. Table 1 shows foam height results using the Ross-Miles foam height method.

TABLE 1

| Surfactant | Average Foam Height (cm) | | | |
| --- | --- | --- | --- | --- |
| | Initial | 1 min | 3 min | 5 min |
| C10MEE-7EO | 16.7 | 14.5 | 9.5 | 2.8 |
| C10MEE-12EO | 14.8 | 11.5 | 8.7 | 4.8 |
| C10MEE-16EO | 13.5 | 11.7 | 9.0 | 4.8 |
| uC10MEE-7EO | 14.8 | 6.2 | 1.0 | 1.0 |
| uC10MEE-12EO | 14.2 | 7.7 | 1.5 | 1.0 |
| uC10MEE-16EO | 11.0 | 6.2 | 1.2 | 1.0 |

Example 3

Polymerization

9-Decenoic acid methyl ester ethoxylates show improved handling characteristics relative to their saturated C10 counterparts. Many nonionic surfactants form intractable (gel) liquid crystalline phases with increasing aqueous concentration. This can be a significant limitation not only in the preparation and transfer aqueous products containing these surfactants, but in maintaining their stability over prolonged periods. Methyl ester ethoxylates derived from 9-decenoic acid showed no gel phase formation and lower viscosity than decanoic acid methyl ester ethoxylates (Table 2). This is vastly improved relative to the linear and other saturated alcohol ethoxylates used in lieu of APEs. Table 2 shows the Brookfield viscosity as a function of aqueous concentration at 25° C.

TABLE 2

| Surfactant | Viscosity (cP) as a Function of Aq. Concentration (Wt. %) | | | | | | | |
|---|---|---|---|---|---|---|---|---|
| | 10 | 20 | 30 | 40 | 50 | 60 | 70 | 80 |
| C10MEE-7EO | 3 | 7 | 15 | 30 | 48 | 44 | 39 | 37 |
| C10MEE-12EO | 4 | 6 | 19 | 47 | 101 | 90 | 74 | 62 |
| C10MEE-16EO | 5 | 8 | 20 | 75 | 133 | 158 | 128 | 102 |
| uC10MEE-7EO | 2 | 5 | 10 | 21 | 30 | 40 | 35 | 35 |
| uC10MEE-12EO | 4 | 6 | 15 | 31 | 60 | 65 | 70 | 60 |
| uC10MEE-16EO | 7 | 10 | 16 | 48 | 85 | 83 | 75 | 79 |

Example 4

Polymerization

Into a 250 ml 4-necked round-bottomed flask (RBF) equipped with a stir bar, thermocouple, condenser, two rubber septa, hot water bath, and nitrogen inlet were added deionized (DI) water (45.6 g) and sodium carbonate (0.08 g). This was stirred (250 RPM) and warmed to 70° C. while nitrogen was being bubbled to degas the water. After 10 minutes, the nitrogen bubbling was discontinued and the anionic surfactant (PolyStep™ B-27, 2.4 g) was added followed by the nonionic surfactant (uC10MEE-12EO, 0.41 g) to obtain an HLB of 20.5. Separately, butyl acrylate (9.0 g, 20 wt %) was mixed with vinyl acetate (36.0 g, 80 wt %) and added to a 50 ml glass syringe. A solution of potassium persulfate (0.040 g) was dissolved into DI water (1.0 g) and placed into a 1 ml glass syringe. Another solution of potassium persulfate (0.05 g) with sodium carbonate (0.10 g) was dissolved into DI water (6 ml) and placed into a 5 ml glass syringe. The monomers were fed into the RBF by a syringe pump and the initial charge of the potassium persulfate solution (1.0 g) was added to the stirred surfactant solution. After 10 minutes, the other solution of initiator (6 ml) was pumped in and the reaction temperature held at 70° C. +/−2° C. The monomer feed was complete after 2 h, the initiator feed finished a half hour later and the reaction was held at 70° C. for an additional hour. Heating was discontinued and the latex was poured through a 600 micron screen to remove any coagulum. The coagulum was added to the residue in the flask and dried (1.9 g). The white latex was weighted (92.6 g) and its percent solids determined (46.9 wt %, 43.4 g solids) to afford a 97.8% mass balance.

What is claimed is:

1. A coating composition, the composition comprising: water; a resin; and a compound of formula (I)

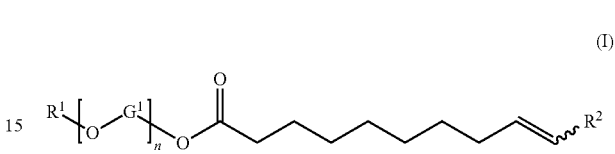

wherein:
  $R^1$ is a hydrogen atom or $C_{1-6}$ alkyl;
  $G^1$ is $C_{1-4}$ alkylene
  $R^2$ is a hydrogen atom, $C_{1-5}$ alkyl, or $C_{2-5}$ alkenyl; and
  n is an integer from 1 to 50.

2. The composition of claim 1, wherein $R^1$ is a hydrogen atom.

3. The composition of claim 1, wherein $R^1$ is $C_{1-6}$ alkyl.

4. The composition of claim 1, wherein $R^1$ is methyl or ethyl.

5. The composition of claim 1, wherein $G^1$ is, independently at each occurrence, —$CH_2$—$CH_2$—, —$CH_2$—$CH_2$—$CH_2$—, —$CH(CH_3)$—$CH_2$—, —$CH_2$—$CH(CH_3)$—, or —$CH_2$—$CH_2$—$CH_2$—$CH_2$—.

6. The composition of claim 5, wherein $G^1$ is —$CH_2$—$CH_2$ at each occurrence.

7. The composition of claim 1, wherein $R^2$ is a hydrogen atom.

8. The composition of claim 1, wherein $R^2$ is $C_{1-5}$ alkyl.

9. The composition of claim 8, wherein $R^2$ is methyl or ethyl.

10. The composition of claim 1, wherein $R^2$ is $C_{2-5}$ alkenyl.

11. The composition of claim 10, wherein $R^2$ is —$CH_2$—$CH$=$CH_2$ or —$CH_2$—$CH$=$CH$—$CH_2$—$CH_3$.

12. The composition of claim 1, wherein n is an integer from 6 to 50.

13. The composition of claim 4, wherein n is an integer from 6 to 50.

14. The composition of claim 6, wherein n is an integer from 6 to 50.

15. The composition of claim 7, wherein n is an integer from 6 to 50.

16. The composition of claim 1, wherein the resin is a film-forming polymer.

17. The composition of claim 16, wherein the film-forming polymer is a natural or synthetic latex.

18. The composition of claim 1, wherein the resin is an alkyd resin.

19. A method for coating a surface, the method comprising:
  providing a composition of claim 1; and
  applying the composition to a surface to be coated.

* * * * *